United States Patent Office.

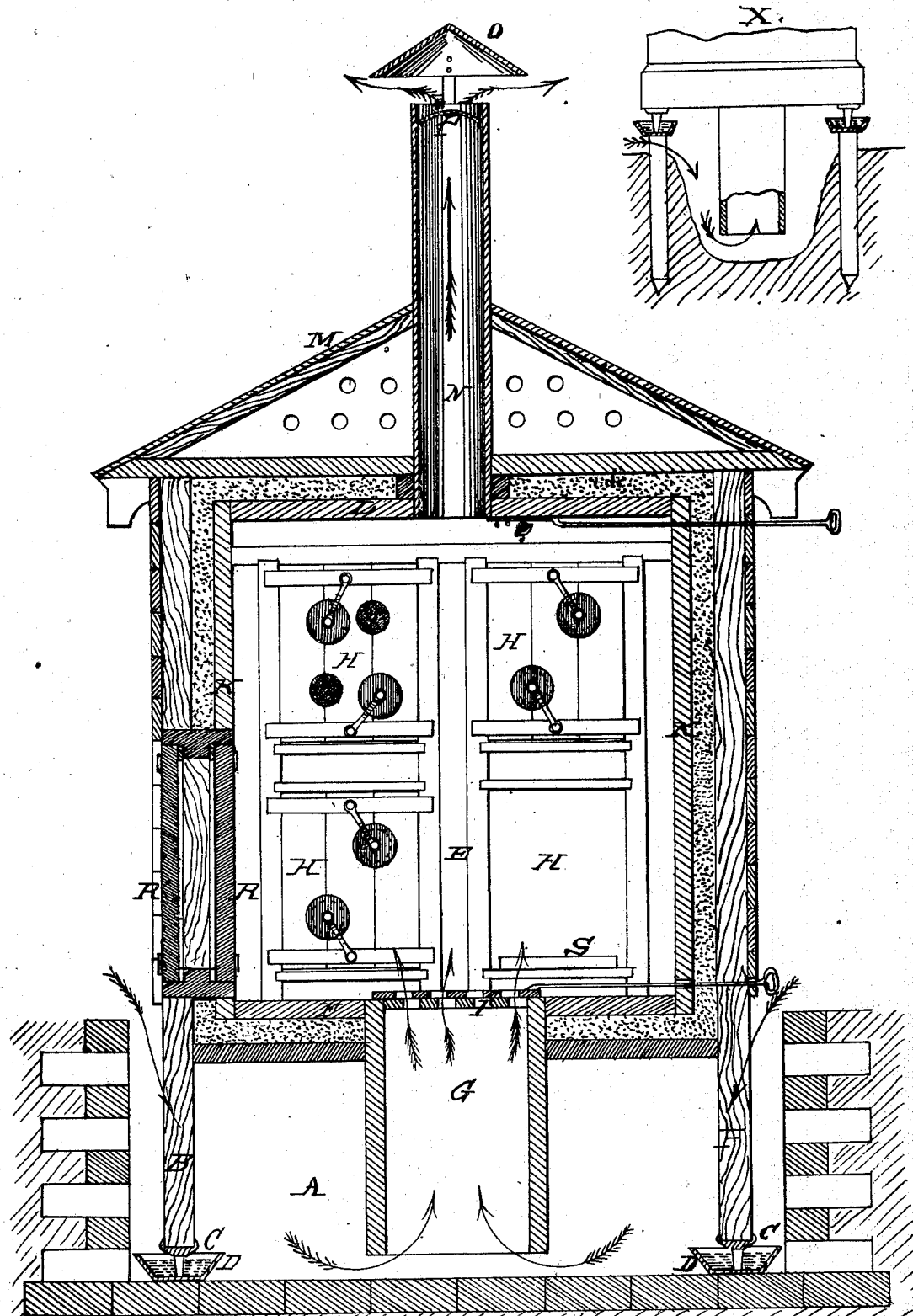

WILLIAM FAULKNER, OF VEVAY, INDIANA.

Letters Patent No. 74,065, dated February 4, 1868.

IMPROVEMENT IN APIARY.

*The Schedule referred to in these Letters Patent and making part of the same.*

TO WHOM IT MAY CONCERN:

Be it known that I, WILLIAM FAULKNER, of Vevay, Switzerland county, Indiana, have invented a new and useful Apiary; and I do hereby declare the following to be a full, clear, and exact description thereof, reference being had to the accompanying drawings, making part of this specification.

My invention relates to a construction of bee-hive building or apiary, adapted to secure perfect ventilation, together with an equable temperature and freedom from vermin.

In the accompanying drawing, an apiary embodying my invention is represented by vertical section.

A is a pit in the ground, and preferably walled, as shown; B are posts, which support and form part of the building, and terminate in iron pins C, which rest in cups D to contain tar or other viscid material for the exclusion of ants and other vermin. E is the apartment for the hives, having a floor, F, with a central hatchway, G, whose sides extend downward nearly to the floor of the pit. The hives H may rest upon the floor of the apiary in the manner shown, or on a raised shelf or daïs, or be suspended from joists or brackets. I is a shutter or register, by which the hatchway may be more or less closed or contracted. The floor F, walls K, and ceiling L, are made double, and packed with chaff or other non-conductor of heat. The roof M may be of the ridge-form, as represented, or of the hip, shed, or other form. N is a flue, which, commencing at or near the level of the ceiling, passes upward through the roof, and is surmounted by a hood or cowl, O, to keep out the weather, and a wire or other screen, P, to keep out moths and other intruders. The flue is capable of being closed or contracted, by means of a register or damper, Q. R is an inner, and R' an outer door, with an intervening space or vestibule between them. S is an aperture (of which there may be several) for the entrance and exit of the bees.

The advantages of this apiary are of a very decided character; for example, the entering air being cooled by being made to traverse the pit A, and the heated air being allowed free exit by way of the flue N, and the apartment, moreover, being protected from vicissitudes of temperature by the insulating-walls K and ceiling L, the bees are enabled, even during the hottest weather, to keep up their labors actively within the hives, instead of hanging in large masses outside, as they commonly do on every sultry day or night, and hence they lay up a much larger store of honey, and being in strong force, are enabled to keep out the miller and other intruders.

When the cold weather approaches, the apiarist contracts the various adits, and thus enables the bees to keep up the desired temperature by the natural warmth of their own bodies. The bees being thus kept comfortably warm, require of course less nutriment than if exposed to the full rigors of winter. An interior modification of my invention is seen at X.

I claim herein as new, and of my invention—

1. The provision, in an apiary, of the sunk hatchway G, pit A, and flue N, together with suitable registers, or their equivalents, substantially as and for the purpose set forth.

2. In combination with the elements of claim first, I claim the insulating-walls K and ceilings L, as and for the purpose explained.

3. An apiary supported on posts, which rest in cups D, in connection with a pit or depression in the ground, and a hatchway, as represented.

In testimony of which invention, I hereunto set my hand.

WILLIAM FAULKNER.

Witnesses:
GEO. H. KINGHT,
JAMES H. LAYMAN.